(12) United States Patent
Hussain et al.

(10) Patent No.: US 7,592,290 B2
(45) Date of Patent: Sep. 22, 2009

(54) SUPPORTED CATALYST FOR STREAM METHANE REFORMING AND AUTOTHERMAL REFORMING REACTIONS

(75) Inventors: Syed Tajammul Hussain, Edmonton (CA); Eugene Stelmack, Fort Saskatchewan (CA)

(73) Assignee: Sulzer Metco(Canada) Inc., Fort Saskatchewan, AB (CA)

( * ) Notice: Subject to any disclaimer, the term of this patent is extended or adjusted under 35 U.S.C. 154(b) by 90 days.

(21) Appl. No.: 10/599,718

(22) PCT Filed: Apr. 7, 2005

(86) PCT No.: PCT/CA2005/000527

§ 371 (c)(1),
(2), (4) Date: Mar. 2, 2007

(87) PCT Pub. No.: WO2005/097319

PCT Pub. Date: Oct. 20, 2005

(65) Prior Publication Data

US 2007/0191221 A1    Aug. 16, 2007

Related U.S. Application Data

(60) Provisional application No. 60/560,038, filed on Apr. 8, 2004.

(51) Int. Cl.
*B01J 21/00* (2006.01)
*B01J 21/04* (2006.01)
*B01J 21/06* (2006.01)
*B01J 21/08* (2006.01)
*B01J 23/00* (2006.01)
*B01J 23/02* (2006.01)
*B01J 23/04* (2006.01)
*B01J 23/10* (2006.01)
*B01J 23/16* (2006.01)
*B01J 23/24* (2006.01)
*B01J 23/26* (2006.01)
*B01J 23/32* (2006.01)
*B01J 23/34* (2006.01)
*B01J 23/38* (2006.01)
*B01J 23/40* (2006.01)
*B01J 23/42* (2006.01)
*B01J 23/44* (2006.01)
*B01J 23/46* (2006.01)
*B01J 23/54* (2006.01)
*B01J 23/56* (2006.01)
*B01J 23/58* (2006.01)
*B01J 23/63* (2006.01)
*B01J 23/70* (2006.01)
*B01J 23/72* (2006.01)
*B01J 23/74* (2006.01)
*B01J 23/745* (2006.01)
*B01J 23/75* (2006.01)
*B01J 23/755* (2006.01)
*B01J 23/76* (2006.01)
*B01J 23/78* (2006.01)
*B01J 23/83* (2006.01)

(52) U.S. Cl. .............. 502/335; 502/240; 502/241; 502/243; 502/244; 502/256; 502/258; 502/259; 502/260; 502/261; 502/262; 502/263; 502/302; 502/303; 502/305; 502/306; 502/308; 502/309; 502/313; 502/314; 502/315; 502/316; 502/317; 502/318; 502/319; 502/320; 502/323; 502/324; 502/325; 502/328; 502/332; 502/333; 502/334; 502/336; 502/337; 502/338; 502/339; 502/340; 502/344; 502/345; 502/346; 502/349; 502/350; 502/355

(58) Field of Classification Search .............. 502/303, 502/305, 313–320, 323–327, 344–346, 355, 502/240, 241, 243, 244, 254, 256, 258–263, 502/302, 306, 308, 309, 328, 332–340, 349, 502/350

See application file for complete search history.

(56) References Cited

U.S. PATENT DOCUMENTS 3,404,100 A    10/1968    Taylor et al.

X1500 x-ray map

| | | | |
|---|---|---|---|
| 3,878,130 | A | 4/1975 | Michel et al. |
| 3,993,459 | A | 11/1976 | Koch et al. |
| 4,018,710 | A | 4/1977 | Oshimura et al. |
| 4,060,498 | A | 11/1977 | Kawagoshi et al. |
| 4,131,569 | A | 12/1978 | Michel et al. |
| 4,215,998 | A | 8/1980 | Futami |
| 4,414,140 | A | 11/1983 | Setzer |
| 4,456,703 | A | 6/1984 | Aldridge |
| 4,469,815 | A | 9/1984 | Sambrook et al. |
| 4,503,029 | A | 3/1985 | Setzer |
| 4,522,940 | A | 6/1985 | Sambrook et al. |
| 4,530,918 | A | 7/1985 | Sambrook et al. |
| 4,539,310 | A | 9/1985 | Leftin et al. |
| 4,734,392 | A | 3/1988 | Ganguli et al. |
| 4,962,280 | A | 10/1990 | Tijburg et al. |
| 5,100,857 | A | 3/1992 | Sato et al. |
| 5,160,456 | A | 11/1992 | Lahn et al. |
| 5,506,273 | A | 4/1996 | Haruta et al. |
| 5,593,647 | A | 1/1997 | Kirby |
| 5,679,614 | A | 10/1997 | Bangala et al. |
| 5,714,092 | A | 2/1998 | Van Looij et al. |
| 5,736,482 | A * | 4/1998 | Durand et al. ............. 502/303 |
| 5,752,995 | A | 5/1998 | Kang |
| 5,882,616 | A | 3/1999 | Ziebarth et al. |
| 6,013,173 | A | 1/2000 | Bogdan |
| 6,048,449 | A | 4/2000 | Bogdan |
| 6,103,660 | A | 8/2000 | Yperen |
| 6,150,300 | A | 11/2000 | Khare et al. |
| 6,180,075 | B1 | 1/2001 | Lindner et al. |
| 6,180,078 | B1 | 1/2001 | Poijarvi et al. |
| 6,287,393 | B1 | 9/2001 | Garg et al. |
| 6,416,731 | B1 | 7/2002 | Dohrup et al. |
| 6,514,904 | B1 | 2/2003 | Moser et al. |
| 6,605,376 | B2 | 8/2003 | Verykios |
| 2002/0042340 | A1 | 4/2002 | Dunleavy et al. |
| 2002/0174603 | A1 | 11/2002 | Ahmed et al. |
| 2003/0032554 | A1 | 2/2003 | Park et al. |

FOREIGN PATENT DOCUMENTS

| | | |
|---|---|---|
| CA | 1196907 B1 | 11/1985 |
| CA | 2196349 B1 | 8/1997 |
| CA | 2359940 A1 | 7/2000 |
| CN | 1042696 A | 6/1990 |
| CN | 123720 | 10/1999 |
| EP | 0044117 B1 | 1/1982 |
| EP | 0470626 A1 | 2/1992 |
| EP | 0692451 A1 | 1/1996 |
| EP | 0741107 A2 | 11/1996 |
| JP | 50-018378 | 2/1975 |
| JP | 55-106295 | 8/1980 |
| JP | 03-245850 | 11/1991 |
| JP | 10-192708 | 7/1998 |
| JP | 10-216521 | 8/1998 |
| RU | 2048909 C1 | 11/1995 |
| WO | 99/47257 A1 | 9/1999 |
| WO | WO 02 089978 A1 | 11/2002 |
| WO | 03/075388 A1 | 9/2003 |
| WO | 03/086627 A1 | 10/2003 |
| WO | 2004000454 A1 | 12/2003 |

OTHER PUBLICATIONS

Olsbye, Unni et al., "Kinetic and Reaction Engineering Studies of Dry Reforming of Methane Over a Ni/La/Al2O3 Catalyst," Industrial & Engineering Chemistry Research vol. 36 No. 12 Dec. 1997, pp. 5180-5188. EFS-Web PDF File Name: Olsbye_pp_5180-5188.

Blom, Richard et al., "Carbon dioxide reforming of methane over lanthanum-modified catlysts in a fluidized-bed reactor," Catalysis Today vol. 21 No. 2-3 Dec. 2, 1994, pp. 535-543. EFS-Web PDF File Name: Blom_pp_535-543.

Xu, Zheng et al., "Ultrafine NiO-La2O3-Al203 aerogel: a promising catalyst for CH4/CO2 reforming," Applied Catalysis A: General vol. 213, No. 1, May 2001, pp. 65-71. EFS-Web PDF File Name: Xu_pp_65-71.

Martinez, R. et al., "The effect of lanthanum on Ni-Al catalyst for catalytic steam gasification of pine sawdust," Fuel Processing Technology vol. 85, No. 2-3, Feb. 15, 2003, pp. 201-214. EFS-Web PDF File Name: Martinez_pp_201-214.

Radwan, Nagi R.E., "Effects of La2O3-doping on physicochemical surface and catalytic properties of nickel and manganese oxides supported on alumina," Applied Catalysis A: General vol. 257, No. 2, Jan. 20, 2004, pp. 177-191. EFS-Web PDF File Name: Radwan_pp_177-191.

Cheng, Zhenxing et al., "Effects of promoters and preparation procedures on reforming of methane with carbon dioxide over Ni/Al2O3 catalyst," Catalysis Today vol. 30, No. 1-3 Jun. 17, 1996, pp. 147-155. EFS-Web PDF File Name: Cheng_pp_147-155.

Chen, Ienwhei et al., "Effect of La, W and Mo on Resistivity to Coke Formation and Sintering of Nickel-Alumina Catalysts," Journal of the Chinese Institute of Chemical Engineers vol. 30 No. 5 1999, pp. 397-404. EFS-Web PDF File Name: Chen_pp_397-404.

Miao, Qing et al., "Partial oxidation of methane to syngas over nickel-based catalysts modified by alkali metal oxide and rare earth metal oxide," Applied Catalysis A : General, vol. 154, No. 1-2, Jun. 12, 1997, pp. 17-27. EFS-Web PDF File Name: Miao_pp_17-27.

Slagtern, Åse et al., "In situ XRD characterization of La-Ni-O model catalysts for CO2 reforming of methane," Applied Catalysis A: General vol. 145, No. 1-2, Oct. 8, 1996, pp. 375-388. EFS-Web PDF File Name: Slagtern_pp_375-388.

Chu, Yanlai et al., "Partial oxidation of methane to carbon monoxide and hydrogen over NiO/La2O3/gamma-AI2O3 catalyst," Applied Catalysis A: General vol. 134 No. 1 Jan. 4, 1996 pp. 67-80. EFS-Web PDF File Name: Chu_pp_67-80.

Ozawa, Masakuni, "Solid-state Reaction and Benzene Removal Activities of composite Powders in Ni-La_Al2O3 System," Journal of the Japan Society of Powder and Powder Metallurgy vol. 44, (11) 1997, pp. 1049-1054. EFS-Web PDF File Name: Ozawa_pp_1049-1054.

* cited by examiner

*Primary Examiner*—Timothy C Vanoy
*Assistant Examiner*—Serena L Hanor
(74) *Attorney, Agent, or Firm*—Patent Innovations LLC; John M. Hammond

(57) ABSTRACT

The invention relates to supported catalysts and a process for the production of these catalysts. These supported catalysts may be used in various reactions such as reforming reactions (e.g. steam methane reforming (SMR) reactions and autothermal reforming (ATR) reactions). In one aspect of the invention, the supported catalyst comprises a transition metal oxide; optionally a rare-earth metal oxide; and a transition metal aluminate.

34 Claims, 5 Drawing Sheets

X1500 x-ray map

X1500 x-ray map

X1500 x-ray map

X1500 x-ray map composite image of Ni,Al,La.

SUPPORTED CATALYST FOR STREAM METHANE REFORMING AND AUTOTHERMAL REFORMING REACTIONS

FIELD OF THE INVENTION

This invention relates to catalysts and the production thereof. More particularly, the present invention relates to supported catalysts for use in reactions such as reforming reactions (e.g. steam methane reforming (SMR) reactions and autothermal reforming (ATR) reactions).

BACKGROUND OF THE INVENTION

Two common reformer technologies are steam methane reforming and autothermal reforming. Both expose hydrocarbon gas, such as natural gas, to a supported catalyst at high temperature and pressure to extract the hydrogen. However, the autothermal reformer burns a portion of the hydrocarbon gas within the reforming vessel to provide heat for the reaction, whereas the steam methane reformer uses hot gases to externally heat tubes containing a mixture of steam and methane. The catalytic reaction in the autothermal reformer takes place in a single, large vessel. By contrast, the steam reformer chamber consists of more than a hundred parallel metal tubes running end to end inside a large heating vessel. Steam and methane flow through the externally heated tubes, which contain catalyst material.

Steam hydrocarbon reforming and autothermal reforming reactions can produce hydrogen, carbon monoxide, carbon dioxide, methane gases, and steam. The composition of the product gas, for instance hydrogen gas, fuel gas or various synthesis gas, depends upon the temperature, pressure and ratios of feed materials such as the steam/carbon ratio, which is defined as a ratio of moles of steam per gram-atom of carbon of the hydrocarbon.

In general, a steam reforming reaction and an autothermal reforming reaction involves a large scale endothermic and exothermic reaction, respectively. When steam reforming is carried out on an industrial scale, heat supply from outside raises technical problems. The overall reaction of industrially employed steam reforming of hydrocarbons, using, for instance, nickel catalysts, is considerably endothermic with the heat of reaction being 49.3 kcal/mol of methane at about 700° C. Although various attempts have been made towards improving the steam reforming reactor and heat recovery system itself, such improvements do not represent solutions for attaining enhanced heat recovery and simplified facilities. Therefore, focus has been directed towards production of more suitable catalysts.

It is preferred that the catalysts for SMR/ATR reactions are capable of high catalytic activity/selectivity and high mechanical strength/stability, in order to withstand normal process conditions. The ideal commercial catalyst would therefore satisfy the dual requirement of high activity/selectivity and long service life (e.g. good strength and stability), such properties become more difficult and specialized if the catalyst is used in a kinetic region and under fluidized conditions.

High catalytic activity is related to the specific surface area of the active metal of the catalyst and the accessibility of that surface area. Generally, the porosity, the pore size distribution, and the geometry of the active metal surface are such that access to the inner pore surface is achieved during the catalyzed reaction. It has been strongly believed that mechanical strength of the catalyst is indirectly proportional to the activity of the catalyst. Therefore, the higher the activity, the lower the mechanical strength. For instance, when the mechanical strength of the catalyst is important, impregnation of low surface area preformed refractory material, such as α-alumina or silica, with the active metal is commonly practiced. Such supported catalysts normally have a low active surface area and consequently, have a lower activity and a lower catalyst life.

The various catalysts produced by existing catalyst technologies, such as impregnation of a preformed carrier, in fact represent compromise between activity and strength. There is a need for a catalyst capable of achieving both a high activity and a good strength.

Other problems associated with existing reforming catalysts include carbon deposition onto the catalyst during the reforming reaction. Carbon deposition onto the catalyst not only lowers the activity of the catalyst but also, over time, even more detrimentally, causes the catalyst to lower its abrasion resistance, disintegrate and block gas conduits, shutting down the reforming process.

To prevent carbon deposition, the steam/carbon ratio is usually increased since low steam/carbon ratios increases the risk that carbon will be deposited on the catalyst, resulting in a loss of activity. An increase in the steam/carbon ratio suppresses the carbon deposition onto the catalyst, which leads to consumption of the feed materials, fuel, etc. Thus, the increase in the steam/carbon ratio would not be an economical way of controlling carbon deposition.

Several catalysts have been formulated to prevent carbon deposition during reforming reactions. U.S. Pat. No. 4,060,498 to Kawagoshi et al. is directed to a process for steam reforming hydrocarbons using a specific type of catalyst to prevent carbon deposition. The catalyst comprises at least 3% by weight, preferably 10 to 30% by weight, of nickel per weight of the catalyst; at least 2 mg-atoms of silver per 100 g of the catalyst; at least one rare-earth element in an atomic ratio of the rare-earth elements to silver of 10 or less, preferably 0.2 to 2.0; and a heat-resistant oxide carrier such as alumina. It is specifically taught that if there is less that 2 mg-atoms of silver per 100 g of the catalyst then the suppression of carbon deposition is not satisfied.

Silver metal is known to lose its stability at higher temperatures and is normally used to convert certain gases to their respective oxides. Consequently, a silver-containing catalyst produces a product stream that includes more carbon monoxide and carbon dioxide, which is more hazardous to the environment.

International Patent Application No. WO 99/47257 to Lallje et al. is directed to a steam reforming catalyst that includes from about 50% to about 75% nickel oxide, from about 5% to about 12% of an alkaline earth oxide, from about 10% to about 40% of a support material and from about 4% to about 20% of a rare-earth oxide promoter. Such a catalyst is not useful for ATR reactions.

Other problems with existing reforming catalysts include the production of these catalysts. It is taught throughout the art to avoid the production of a supported catalyst containing metal aluminates since such catalysts are difficult to reduce and have negligible activity. U.S. Pat. No. 4,962,280 to Tijburg and Geus is directed to a process for making a catalyst that involves, for example, suspending alumina in water and adjusting the pH to 5 by adding nitric acid, followed by the addition of lanthanum nitrate in an EDTA solution. The suspension produced was filtered and dried at high temperatures. Cobalt nitrate was added to a suspension of the dried alumina/lanthanum oxide. The pH of the solution of cobalt nitrate and alumina/lanthanum oxide was adjusted using nitric acid. The resulting solid was selectively heated to avoid the formation of cobalt aluminate.

Another problem with existing reforming catalysts involves sulfur poisoning. Trace amounts of sulfur found in feeds reacts with the active catalytic sites of the catalysts, ruining their activity. U.S. Pat. No. 4,215,998 to Futami is directed to a catalyst for production of methane-containing gases which is formed from a catalyst precursor composed of a mixed precipitate of hydroxides and/or carbonates of nickel, lanthanum and aluminum, which is obtained by stepwise addition of solutions of alkaline substances to a solution of an aluminum salt, a solution of a lanthanum salt, and a solution of a nickel salt. This stepwise addition of solutions of alkaline substances is accomplished by (1) first stage addition of a solution of an alkaline substance to a solution of an aluminum salt, (2) second stage addition of a solution of an alkaline substance to a solution of a lanthanum salt in the presence of the precipitate-containing solution formed by the first stage addition and (3) third stage addition of a solution of an alkaline substance to a solution of a nickel salt in the presence of the precipitate-containing solution formed by the second stage addition. The resulting precipitate is heated to 100-400° C. The catalyst, however, is not sulfur resistant. It is suggested that sulfur be removed from the hydrocarbon feed before being subjected to the steam-reforming reaction with this type of catalyst.

U.S. Pat. No. 4,539,310 to Leftin and Patil is directed to a steam reforming catalyst that is particularly useful for reforming feedstocks containing from a trace amount to about 5% by weight sulfur. The catalyst contains nickel oxide, rare-earth metal oxide, and zirconium oxide. Other refractory oxides may also be incorporated into the catalyst composition, such as alumina. It is taught, however, that care should be taken not to form spinel-type structures, such as nickel aluminate, since such formations reduce nickel content.

Oxidation is another concern with respect to the existing reforming catalysts. The chemistry of autothermal reforming is similar to that of steam methane reforming, but differs in that there is a concurrent partial oxidation step. Oxidation of the reforming catalyst will also attribute to its' reduced activity.

At present, two different types of catalysts are used for ATR and SMR reactions. There is a need for a reforming catalyst that may be used in both types of reactions.

There is also a need for a reforming catalyst that obviates or mitigates at least some of the disadvantages of the prior art catalysts and processes. For instance, there is a need for a reforming catalyst that is resistant to carbon deposition, sulfur poisoning and oxidation, even at low steam/carbon ratios. In addition, there is a need for a reforming catalyst that may be used at a wide range of temperatures and pressures and still maintain a high activity. There is also a need for a catalyst that has a high attrition resistance such that the catalyst would work in a fluidized bed system.

SUMMARY OF THE INVENTION

The invention relates to a relatively high surface area catalyst with specific active sites. Although it is strongly believed in the art that the mechanical strength of the catalyst is indirectly proportional to the activity of the catalyst, the catalyst of the present invention has both a relatively high surface area and a good strength.

In one aspect of the present invention, there is provided a catalyst of relatively high surface area and yet has the benefits of high mechanical strength, good reactivity and longer service life in SMR/ATR reactions.

In another aspect of the present invention, there is provided a supported catalyst comprising: a transition metal oxide; and a transition metal aluminate. The supported catalyst optionally comprises a rare-earth metal oxide.

In yet another aspect of the present invention, there is provided a supported catalyst comprising: from about 10% to about 80% by weight of nickel oxide; from about 1% to about 10% by weight of lanthanum oxide; and from about 10% to about 60% by weight of a mixture of nickel alumina and nickel aluminate.

In another aspect of the present invention, there is provided a process for making a supported catalyst comprising: combining a catalytic active component, a catalyst support optionally containing a promoter therein, and an acid material to form a slurry; adjusting the slurry to a pH of about 7 to about 8; and recovering the supported catalyst from the slurry. In yet another aspect of the present invention, there is provided a supported catalyst formed by this process.

In a further aspect of the present invention, there is provided a process for making a supported catalyst comprising: dispersing a catalytic active component within pores of a catalyst support, wherein the catalyst support optionally contains a promoter therein; and converting the catalytic active component to an active metal complex intermediate at a pH of about 7 to about 8, the active metal complex intermediate coating surfaces of the catalyst support. In yet a further aspect of the present invention, there is provided a supported catalyst formed by this process.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will be further understood from the following description with reference to the Figures, in which:

FIGS. 1A-1D show, using Scanning Electron Microscopy (SEM), the dispersion of lanthanum and nickel oxide within aluminate pores of a nickel oxide-lanthanum oxide-aluminate catalyst according to an embodiment of the present invention and FIG. 1E shows an X-Ray map spectrum (EDAX (Energy Dispersive X-Ray Fluorescence) analysis) of the nickel oxide-lanthanum oxide-aluminate catalyst;

DETAILED DESCRIPTION OF THE PREFERRED EMBODIMENTS

Figure 1A:
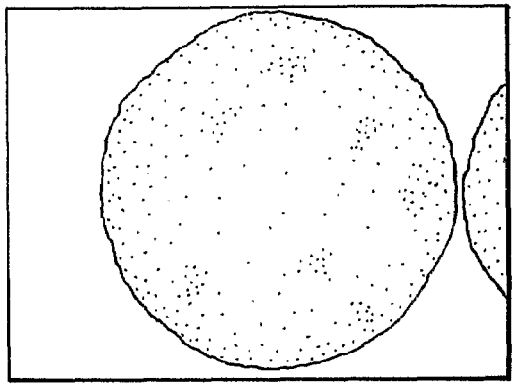
FIGS. 1A-1E.
Figure 1B:
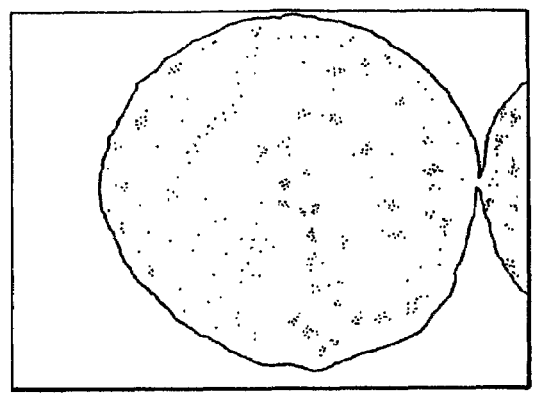
Figure 1C:
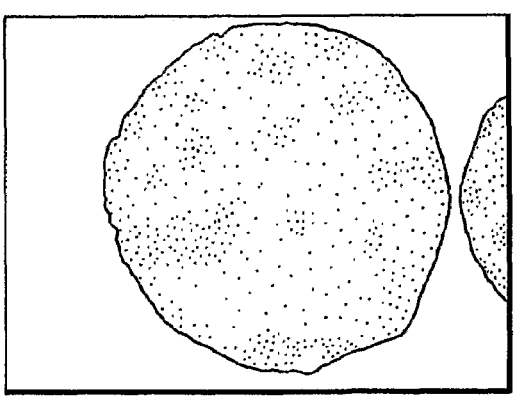
Figure 1D:
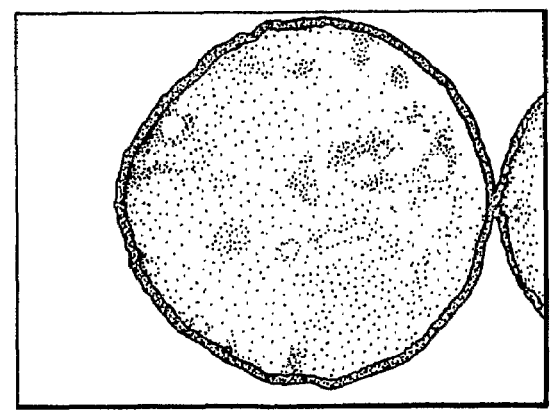

The invention relates to supported catalysts and a process for the production of these catalysts. Supported catalysts for both low and high temperature reactions have been prepared, with good mechanical properties for both steam/autothermal reforming of hydrocarbons.

The supported catalyst of the present invention is resistant to carbon deposition, sulfur poisoning and oxidation. In addition, the supported catalyst may be used at a wide range of temperatures and pressures while still maintaining a high activity, which may be attributed to the presence of different active sites on the surface of the supported catalyst. The supported catalyst can be used at low temperatures and at low steam/carbon ratios while still maintaining its overall stability. The supported catalyst is also applicable to fluidized bed systems since the catalyst has a high attrition resistance.

In general, the supported catalyst of the present invention comprises MSup, $MO_x$ and, optionally, a rare-earth metal oxide, wherein M is a transition metal, Sup is a catalyst support and/or derivative thereof, and x is an integer. Other active metal sites may be present, however, each are typically present in less than about 5% by weight of various permutations of M, Sup, $MO_x$, and, optionally, rare-earth metal and rare-earth metal oxide. In one embodiment, the supported catalyst comprises from about 10% to about 90% by weight of MSup, from about 10% to about 90% by weight of $MO_x$. In another embodiment, the supported catalyst comprises from about 10% to about 60% by weight of MSup, from about 10% to about 80% by weight of $MO_x$, and from about 1% to about 10% by weight of a rare-earth metal oxide. The % by weight is based upon the total weight of the supported catalyst. As mentioned, other active metal sites may be present but are each typically present in less than about 5% by weight of various permutations of M, Sup, $MO_x$, rare-earth metal, and rare-earth metal oxide.

Supported catalysts of the present invention may be used at the upper and/or lower ends of a reformer. Supported catalysts containing rare-earth metals may be used for both SMR and for ATR reactions. Supported catalysts without the rare-earth metal are typically used at the lower end of the reformer. Prior to the use of the supported catalyst in a reforming reaction, the supported catalyst is typically reduced under hydrogen to convert the transition metal oxide(s) and rare-earth metal oxide(s) to their corresponding metals.

In a further embodiment of the supported catalyst, the catalyst comprises from about 10% to about 90% by weight, typically from about 30% to about 50% by weight, of transition metal aluminate, and from about 10% to about 90% by weight, typically from about 50% to about 70% by weight, of a transition metal oxide. The % by weight is based upon the total weight of the supported catalyst. In a more specific embodiment, the transition metal is nickel. Transition metal alumina and transition metal aluminides may also be present.

As an alternative to transition metal aluminate, there may be a mixture of transition metal alumina and transition metal aluminate, wherein the mixture itself may be present in similar percentages as that for the transition metal aluminate alone. The ratio of transition metal alumina to transition metal aluminate may be from about 1:1 to about 1:4.

In a specific embodiment of the supported catalyst, the catalyst comprises from about 10% to about 60% by weight, typically from about 30% to about 50% by weight, of a transition metal aluminate, from about 1% by weight to about 10% by weight, typically from about 0.5% to about 2% by weight, of rare-earth metal oxide, and from about 10% to about 80% by weight, typically from about 15% to about 30% by weight, of transition metal oxide. The % by weight is based upon the total weight of the supported catalyst. Transition metal alumina, transition metal aluminides, rare-earth metal alumina and rare-earth metal aluminides may also be present. In addition, other active metal sites may be present but are each typically present in less than about 5% by weight and may include at least one of a transition metal, transition metal oxide-rare-earth metal, a rare-earth metal-alumina, a transition metal oxide-rare-earth metal-alumina, a rare-earth metal oxide-alumina, a rare-earth metal-aluminate, a transition metal oxide-rare-earth metal-aluminate, a rare-earth metal oxide-aluminate, a rare-earth metal aluminide, aluminate, and a transition metal aluminide. In a more specific embodiment, the transition metal is nickel and the rare-earth metal is lanthanum, wherein other active metal sites that may be present, each in less than about 5% by weight, may include at least one of nickel, nickel oxide-lanthanum, lanthanum-alumina, nickel oxide-lanthanum-alumina, lanthanum oxide-alumina, lanthanum-aluminate, nickel oxide-lanthanum-aluminate, lanthanum oxide-aluminate, lanthanum aluminide, aluminate, and nickel aluminide. As an alternative to transition metal aluminate (e.g. nickel aluminate), there may be a mixture of transition metal alumina and transition metal aluminate (e.g. nickel alumina and nickel aluminate, respectively), wherein the mixture itself may be present in similar percentages as that for transition metal aluminate alone. The ratio of transition metal alumina to transition metal aluminate may be from about 1:1 to about 1:4.

Figure 1E:
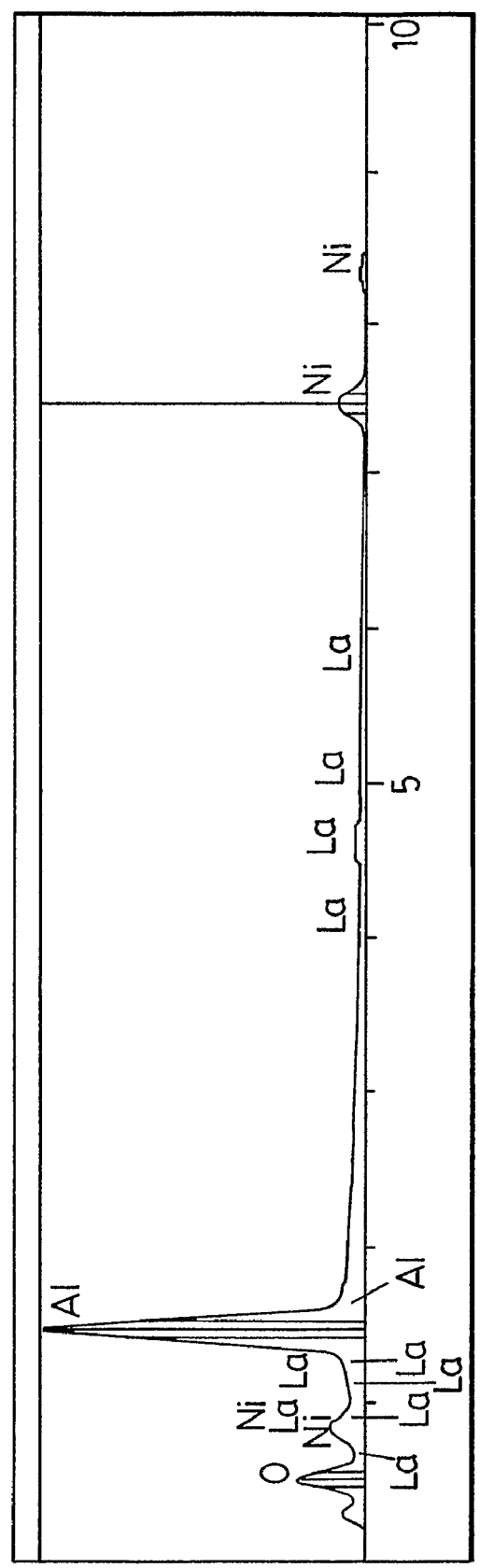
Figure 2:
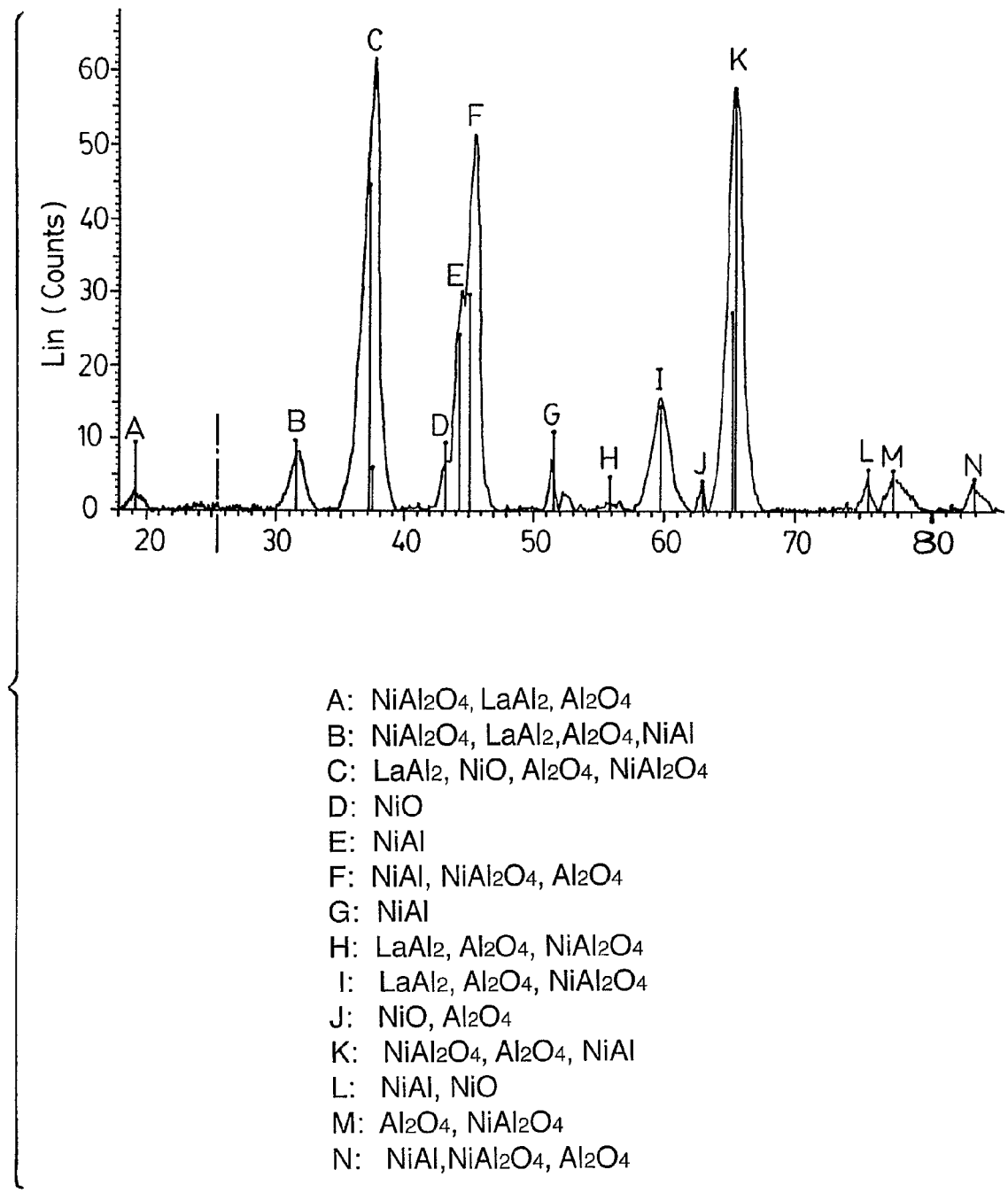
FIG. 2 shows an X-Ray Diffraction spectrum of the nickel oxide-lanthanum oxide-aluminate catalyst of an embodiment of the present invention.

The lanthanum oxide of the nickel oxide-lanthanum oxide-aluminate catalyst is finely dispersed within the matrix of the aluminate, which, without being bound by theory, not only creates an electronically modified specific geometry of the aluminate for the incoming active metal component, but also resists carbon formation and oxidation. FIGS. 1A-D specifically show, using Scanning Electron Microscopy (SEM), the dispersion of lanthanum oxide and nickel oxide within the aluminate pores. If the distribution was not uniform, then the nickel oxide would appear on the surface of the catalyst support as clusters and a decrease in the overall surface area would result. FIG. 1E shows an X-Ray map spectrum (EDAX (Energy Dispersive X-Ray Fluorescence) analysis) of the nickel oxide-lanthanum oxide-aluminate catalyst. In the present catalyst, however, the catalytic support substrate, such as alumina, has an initial surface area of about 80 $m^2g^{-1}$ and the final surface area of the supported catalyst is about 140 $m^2g^{-1}$. Normally, the overall surface area decreases with the addition of an active metal component, followed by controlled oxidation at high temperature. However, the supported catalyst of the present invention is stabilized and the active metal component is redistributed very finely and uniformly on the surface. FIG. 2 shows the X-Ray Diffraction spectrum for this specific nickel oxide-lanthanum oxide-aluminate catalyst, showing that the supported catalyst surface has a very well dispersed geometry and constitutes different active sites on the catalyst surface. The FWHM (Full Width Half Maximum Height) is very broad at various 2θ values, which indicates a very fine dispersion of the individual phases present in the supported catalyst. The specific 2θ values for the nickel oxide-lanthanum oxide-aluminate catalyst are: 19.1° (±0.2), 31.5° (±0.2), 37.1° (±0.2), 45.0° (±0.2), 59.7° (±0.2), 65.8° (±0.2), 75.6° (±0.2), 77.9° (±0.2), and 83.0° (±0.2).

When the supported catalyst of the present invention, such as the nickel oxide-lanthanum oxide-aluminate, is used in a low temperature reforming reaction, it is believed that, without being bound by theory, the catalyst surface geometry not only inhibits the formation of undesirable species from side reactions by increasing the diffusion rate of reactants but the selectivity is also enhanced under SMR and ATR conditions in fluidized and fixed bed applications.

The surface area of the supported catalyst of the present invention may be from about 10 $m^2/g$ to about 500 $m^2/g$ or, more specifically, about 140 $m^2/g$ to about 150 $m^2/g$. Typical particle sizes of the supported catalyst may be from about 2 microns to about 80 microns. Typically, a particle size of from about 50 microns to about 70 microns is utilized in fluidized bed applications. For fixed bed applications, the supported catalysts may be shaped into any form, for instance, pellets and cylindrical shapes. The particle sizes usually used for these forms are from about 2 microns to about 10 microns. Other particle sizes may be prepared by, for instance, adjusting the controlled oxidation/reduction.

In a general embodiment, the supported catalyst of the present invention can be prepared by precipitating a catalytically active component together with a catalyst support, optionally containing an appropriate promoter therein.

A "catalytic active component" as used herein means a transition metal or transition metal compound thereof that has catalytic activity, for instance, as is, if reduced, or in an otherwise activated state. The catalytic active component may be any transition metal salt that in the presence of a base, such as, for example, aqueous ammonia, metal hydroxides, or ethylene glycol, yields an active transition metal complex intermediate at a pH of from about 7 to about 8, typically about 7.5. The catalytically active component used may include transition metal oxides and/or transition metal salts such as transition metal nitrates, transition metal carbonates, transition metal oxalates, transition metal formates, and the like. The transition metals used in the catalyst of the present invention may include, for instance, the Group VIIIB elements, such as nickel, cobalt and ruthenium, and mixtures of the Group VIIIB elements. Nickel is typically used.

A "promoter" as used herein means a material which brings about selectivity in a supported catalyst compared to a supported catalyst without the promoter. For example, the promoter inhibits undesirable side reactions, facilitates product selectivity and a longer catalyst service life. The promoter may be added to the catalyst support by simply impregnating the catalyst support with the promoter. In this case, the temperature of the calcinations of the impregnated catalyst support may be controlled to achieve desired electronically modified specific geometry of the catalyst support.

The promoters may be rare-earth metals, which may include scandium, yttrium, lanthanum, the lanthanide series of metals, such as cerium, and mixtures thereof. In more specific embodiments, lanthanum is typically used. The promoter may be in the form of rare-earth oxides and/or rare-earth salts including rare-earth nitrates, carbonates, hydroxides, oxalates, and the like.

In a specific embodiment of the process of the present invention, a catalytic active component, a catalyst support, optionally containing a promoter therein, and an acid material are combined to form a slurry. The addition of the various substrates may be done sequentially or simultaneously. Without being bound by theory, it is believed that the promoter increases the attrition resistance and stability of the resulting supported catalyst by reducing the acid sites responsible for carbon/sulfur deposition and it is further believed that the acid material acts to open the pores of the catalyst support such that the catalytic active component is better received within the pores. A basic material is then added to the slurry, followed by agitation and heating. Once the pH of the slurry is at about 7 to about 8, the agitation and heating is stopped, yielding a specific active metal complex intermediate, which precipitates within the pores of the catalyst support to create a rough surface on the catalyst support. It is possible to use a mixture of catalytic active components, wherein at least one catalytic active component is selectively precipitated onto the catalyst support as a specific metal complex intermediate. The supported catalyst is subsequently heated providing a substantially stable, high surface area supported catalyst with high attrition resistance and high activity. This process can provide any one of the supported catalyst embodiments discussed above.

The concentration of substrates used in the process of the present invention may include from about 20% to about 80% by weight of a catalytic active component and from about 20% to about 80% by weight of a catalyst support, optionally containing a promoter therein. The % by weight is based upon the total weight of the catalytic active component and the catalyst support optionally containing the promoter therein. The initial concentration of promoter may be from about 1% by weight to about 20% by weight of the catalyst support.

The acid materials used in the process may include nitric acid, hydrochloric acid and the like. The basic materials may include ammonium hydroxides, metal hydroxides, such as sodium hydroxide, ethylene glycol and the like.

Alumina, in one or more of the existing crystal modifications thereof (e.g. $\alpha$, $\beta$, $\gamma$), is one of the many catalyst supports that may be used to yield the supported catalyst of the present invention. Others may include ceramics such as silica, magnesia, titania, zirconia, beryllia, thoria, zeolites, calcium aluminates, and the like. The catalyst support may be of any shape, for example, spherical or cylindrical, or in a crushed form or powdery form. The catalyst support may have an apparent porosity in the range of about 15% to about 80% and may have a mean pore diameter in the range of about 0.05 microns to about 20 microns.

It is advantageous to raise the effective diffusion coefficient of a supported catalyst by devising a highly porous structure and thus, a highly active supported catalyst. For instance, in order to perform a steam-reforming reaction of hydrocarbons, this type of highly porous supported catalyst would allow good diffusion of reaction material(s) and product(s) throughout the pores. This has been realized in the supported catalyst of the present invention. Generally and without being bound by theory, the high activity of the supported catalyst is believed to be due to at least one of finely dispersing the catalytically active component within the pores of the catalyst support; converting the catalytically active component to a specific active metal complex intermediate at a pH of about 7 to about 8, which precipitates within the pores of the catalyst support, coating the surfaces (e.g. external and internal surfaces), of the catalyst support thus, providing a higher surface area coverage of the active metal complex intermediate; and utilizing controlled thermal treatment.

Mixtures of catalytic active components may also be used. For instance, co-impregnation of mixtures of transition metal salts, followed by controlled precipitation of active transition metal complex intermediates at a pH of from about 7 to about 8, typically 7.5, may be used.

In a more specific embodiment of the process of the present invention, from about 20% to about 80% by weight of a catalytic active component, from about 20% to about 80% by weight of a catalyst support, and nitric acid are combined to form a slurry. The % by weight is based upon the total weight of the catalytic active component and the catalyst support. The catalytic active component is nickel nitrate and the catalyst support is alumina. The slurry is digested, followed by the addition of aqueous ammonia to the slurry. The slurry is digested and heated to about 95° C. to about 100° C. for a few hours. The heating is stopped once the slurry has reached a pH of about 7.5, producing a particularly active nickel complex intermediate, which deposits within the pores of the alumina providing a better active nickel dispersion and well defined surface geometry. The slurry is filtered and the precipitate recovered, washed and dried at about 120° C. The precipitate is heated to a temperature of from about 800° C. to about 970° C., typically about 960° C., in the presence of an oxidizing gas to yield the supported catalyst. The resulting supported catalyst comprises from about 10% to about 90% by weight, typically from about 30% to about 50% by weight, of nickel aluminate, and from about 10% to about 90% by weight, typically from about 50% to about 70% by weight, of nickel oxide. The % by weight is based upon the total weight of the supported catalyst.

In another embodiment of the process of the present invention, from about 20% to about 80% by weight of a catalytic active component, from about 20% to about 80% by weight of a catalyst support containing a promoter therein, and nitric acid are combined to form a slurry. The % by weight is based upon the total weight of the catalytic active component and the catalyst support containing the promoter therein. The catalytic active component is nickel nitrate and the catalyst support containing the promoter therein is lanthanum oxide doped alumina, wherein the lanthanum oxide is from about 1% by weight to about 20% by weight of the catalyst support. The slurry is digested, followed by the addition of aqueous ammonia to the slurry. The slurry is digested and heated to about 95° C. to about 100° C. for a few hours. The heating is stopped once the slurry has reached a pH of about 7.5, producing a particularly active nickel complex intermediate, which deposits within the pores of the lanthanum oxide doped alumina providing a better active nickel dispersion and well defined surface geometry. The slurry is filtered and the precipitate recovered, washed and dried at about 120° C. The precipitate is heated to a temperature of from about 800° C. to about 970° C., typically about 960° C., in the presence of an oxidizing gas to yield the supported catalyst. The resulting supported catalyst comprises from about 10% to about 60% by weight, typically from about 30% to about 50% by weight, of nickel aluminate, from about 1% by weight to about 10% by weight, typically from about 0.5% to about 2% by weight, of lanthanum oxide, and from about 10% to about 80% by weight, typically from about 15% to about 30% by weight, of nickel oxide. The % by weight is based upon the total weight of the supported catalyst. Other active metal sites may be present but are each present in less than about 5% by weight and may include nickel oxide-lanthanum, lanthanum-aluminate, nickel oxide-lanthanum-aluminate, lanthanum oxide-aluminate, lanthanum-alumina, nickel oxide-lanthanum-alumina, lanthanum oxide-alumina, lanthanum aluminide, aluminate, and nickel aluminide.

The controlled thermal treatment in the presence of an oxidizing gas does not appear to effect the total active metal dispersion on the surface of the catalyst, but instead, it is believed that the thermal treatment contributes to catalyst stability and high attrition resistance. Normally, such temperatures are avoided in the art since the particles are sintered. In the present invention, the thermal treatment redisperses the particles rather than causing the sintering of the particles.

The supported catalyst may be utilized prior to controlled thermal treatment, or the supported catalyst may be modified further to meet the requirements of a particular reaction, such as a specific reforming reaction. When the supported catalyst undergoes controlled thermal treatment, there is increased formation of transition metal aluminates. To date, aluminates have been avoided in the art since they were believed to be detrimental to the activity of the catalyst and acted as a catalyst poison. It was found, however, in the present supported catalyst, that the opposite effect had occurred. Without being bound by theory, it is believed that transition metal aluminates increase thermal stability and activity of the catalyst.

The supported catalyst of the present invention may be used for low/high temperature steam/autothermal reforming of hydrocarbons in one or both of the thermodynamic and kinetic regions at low steam/carbon ratios.

Additional metal oxides, such as magnesium oxide, may be added within the matrix of the catalyst support to modify the catalytic properties of the supported catalyst. Such a supported catalyst could be used for hydrogenation/dehydrogenation reactions.

The supported catalyst of the present invention may be applied to steam reforming and autothermal reforming reactions of a wide range of feed hydrocarbons including methane, off-gas from processes utilizing various hydrocarbon materials as a feed, liquefied natural gas, hydrocarbons having higher molecular weights than that of methane, for example, propane and other higher hydrocarbons or liquid hydrocarbons such as liquefied petroleum gas, butane, hexane, petroleum light distillates, naphtha, and the like.

Other possible applications of the supported catalyst include methanation of gases containing a high concentration of carbon oxides, particularly arising from coal gasification processes in fluidized and fixed bed reactions. Unlike in the present day reformers wherein two different types of catalysts have to be used for the upper and lower ends of the reformer, the supported catalyst of the present invention can be used at both the upper and lower ends of the reformer and may also be used in ATR reactions.

The supported catalyst is very stable at low temperature and performs well at low steam/carbon ratios. Since the catalyst has high attrition resistance, the loss of catalyst due to abrasion during a reforming reaction is negligible. Abrasion will cause the particle shape of the supported catalyst to change and adversely effect the production of hydrogen gas. The supported catalyst may be used for the production of hydrogen gas and nanocarbon material without the formation of carbon monoxide and carbon dioxide, thus, an environmentally friendly process.

Any ranges used herein are meant to include any narrower numerical ranges therein. The term "a" is meant to include one or more.

The above disclosure generally describes specific embodiments of the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

Example 1

Supported Catalyst Preparation

A solution was prepared by dissolving about 75 g of $Ni(NO_3)_2 \cdot 6H_2O$ in about 0.563 L of deionized water. About 48 g of 1.9% by weight lanthanum oxide doped alumina (commercially available from Grace Davison) and about 0.012 L of nitric acid was added to the solution at room temperature to form a slurry. The slurry was digested for 30 minutes. About 0.341 L of 28% aqueous ammonium hydroxide solution was added slowly to the slurry and digested for about 30 minutes. The slurry was then heated to about 90-95° C. under vigorous agitation for about 4 hours to a final pH of about 7.5. The resulting green precipitate was filtered and washed with water. The washed precipitate was dried overnight at 120° C., followed by heating at about 960° C. for 2 hours to form the supported catalyst.

Stability Test

The supported catalyst was aged in hydrogen gas/steam flow rates of 200 mls/min at 550° C. for 6 hours to determine the stability of the supported catalyst. Various hydrogen gas/steam ratios were used. The particle size measured before and after the treatment was found to be the same in both cases; d50=55 microns.

Attrition Test 100 g of supported catalyst was fluidized by blowing 200 mls/min of nitrogen through a closed fluidizable reactor and the temperature of the supported catalyst bed was raised to 650° C. The test was conducted for 24 hours and the sample was tested for fines before and after the test. Between 1-2% fines were found after the test, which indicates high particle attrition resistance quality.

Supported Catalyst Activity: Fixed Bed SMR/ATR Tests

Figure 5:
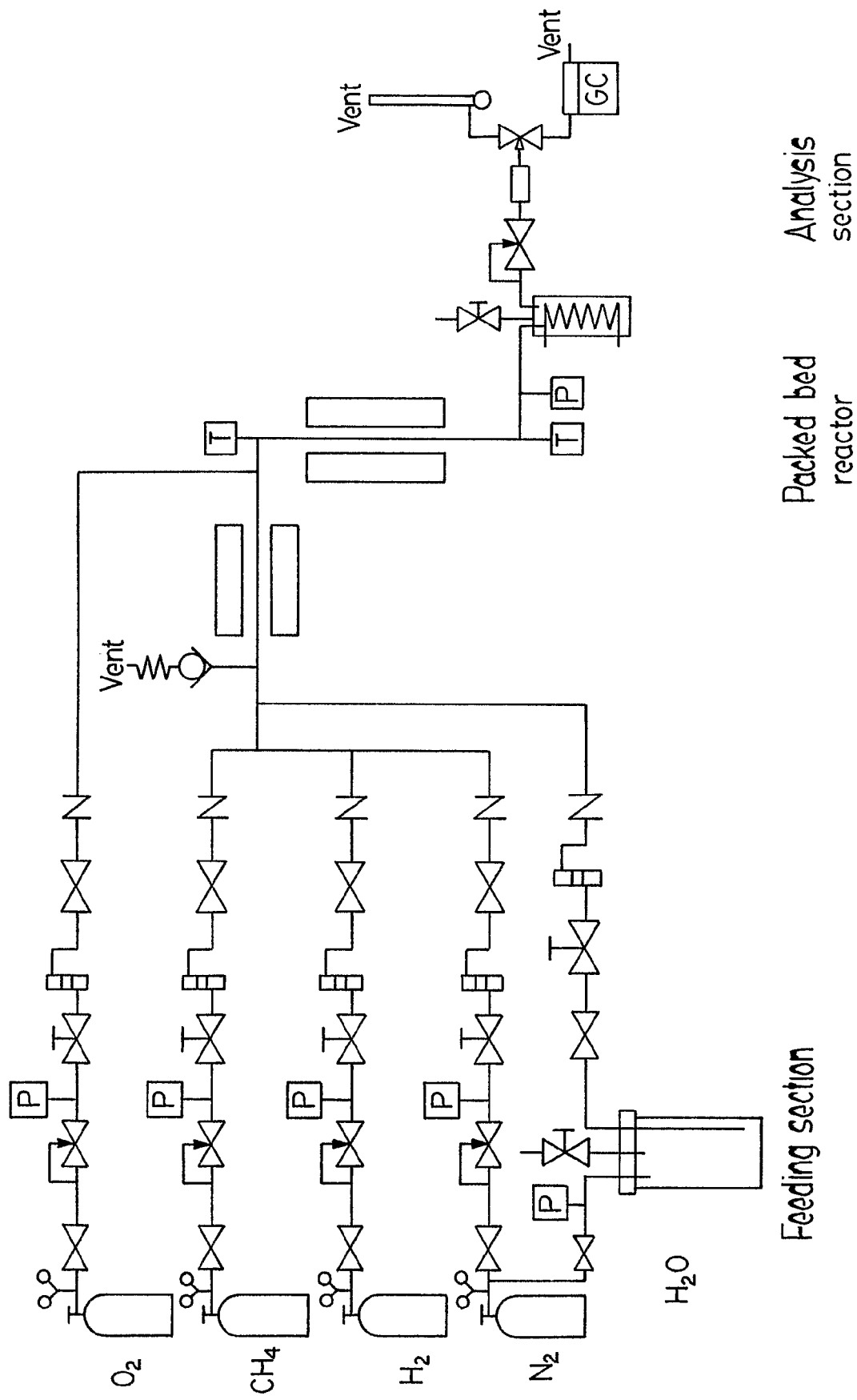
FIG. 5 shows a type of reactor that can be used for the steam methane reforming (SMR) and the autothermal reforming (ATR) reactions.

The activity of the supported catalyst in SMR/ATR was determined using the reactor system shown in FIG. 5. In both cases, the reactor was loaded with about 0.3 g of the supported catalyst, which was reduced under hydrogen for 4 hours at 650° C. before starting the catalytic studies.

The conditions used for the SMR Test were as follows:
Supported catalyst weight: 0.3 g
Temperature of Reaction: 550° C. or 650° C.
Hourly gas space velocity: 6000 $h^{-1}$
Steam/carbon ratio: 3.0
Carbon/hydrogen ratio: 1.0

Figure 3:
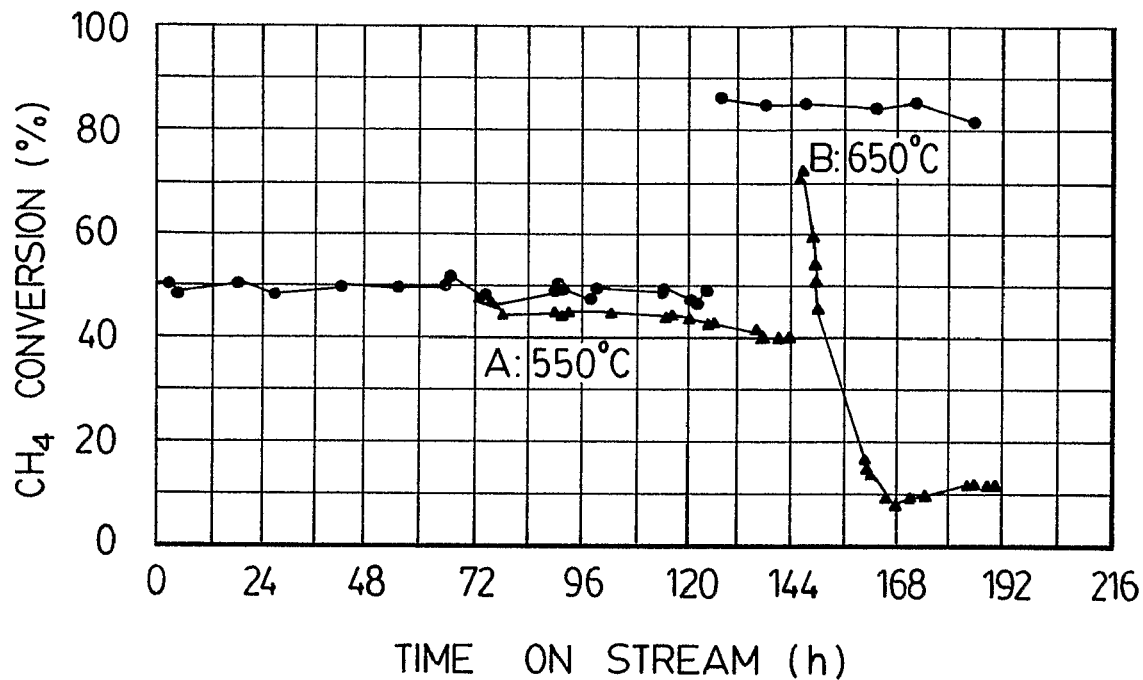
FIG. 3 shows a graph of % Methane Conversion vs. Time on Stream (h) catalyst during a steam methane reforming (SMR) reaction utilizing the nickel oxide-lanthanum oxide-aluminate catalyst of an embodiment of the present invention as compared to a commercial catalyst.

The outgases were analyzed with the programmable gas chromatograph (GC) fitted with a flame ionization detector (FID) and a thermocouple detector (TCD). The activity of the supported catalyst was tested and compared to some of the best commercial catalysts for 144 hours at 550° C., followed by an increase in temperature to about 650° C. for a further 48 hours. The test results at 550° C. and 650° C. are shown in FIG. 3. The commercial catalyst showed decreasing activity after about 144 hours, whereas the activity of the supported catalyst remained relatively constant.

The conditions used for the ATR Test were as follows:
Supported Catalyst weight: 0.3 g
Temperature of Reaction: 550° C.
Hourly gas space velocity: 6000 $h^{-1}$
Steam/carbon ratio: 3.0
Oxygen/carbon ratio: 2.0

Figure 4:
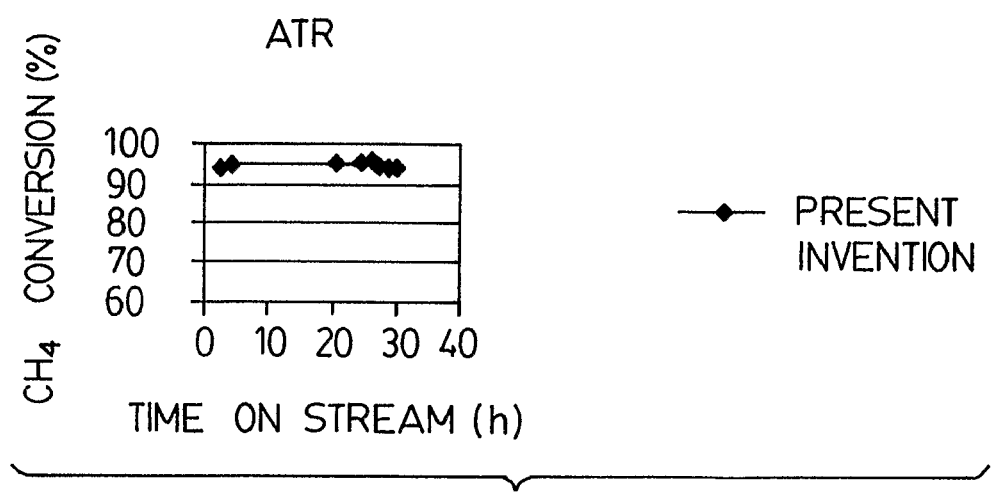
FIG. 4 shows a graph of % Methane Conversion vs. Time on Stream (h) during an autothermal reforming (ATR) reaction utilizing the nickel oxide-lanthanum oxide-aluminate catalyst of an embodiment of the present invention.

The outgases were analyzed with the programmable gas chromatograph (GC) fitted with a flame ionization detector (FID) and a thermocouple detector (TCD). The activity of the supported catalyst was tested for 30 hours and is shown in FIG. 4. The activity of the present supported catalyst remained relatively constant.

Fluidized Bed Test

The reactor was loaded with a mixture of 10% supported catalyst and 90% alumina of the same particle size. The SMR and ATR studies were performed under the conditions of the fixed bed reactor. The reaction was performed for 5 days and the activity of the supported catalyst was measured using an on-line GC. The particle size was determined before and after the reaction to ascertain the particle disintegration during the test. The activity of the supported catalyst remains stable at 26% conversion of natural gas to hydrogen and the change in particle size was 1% after the fluidized tests. This test shows that the supported catalyst is useful in fluidized bed applications.

Example 2

A supported catalyst was prepared as described in Example 1, except that the alumina carrier was impregnated with a solution of cerium nitrate, followed by calcination at 400° C. for 4 hours prior to impregnation of the nickel salt.

Example 3

A supported catalyst was prepared as described in Example 1, except that the lanthanum oxide doped alumina carrier was replaced with magnesium oxide.

The activity of the supported catalyst in SMR/ATR was determined using the reactor system shown in FIG. 5. The reactor was loaded with about 0.3 g of the supported catalyst, which was reduced under hydrogen for 4 hours at 650° C. before starting the catalytic studies.

The conditions used for the SMR Test were as follows:
Supported catalyst weight: 0.3 g
Temperature of Reaction: 550° C.
Hourly gas space velocity: 6000 $h^{-1}$
Steam/carbon ratio: 3.0
Carbon/hydrogen ratio: 1.0

The outgases were analyzed with the programmable gas chromatograph (GC) fitted with a flame ionization detector (FID) and a thermocouple detector (TCD). The test results showed that the activity of the supported catalyst remained relatively constant at 50% conversion of natural gas to hydrogen.

Example 4

A supported catalyst was prepared as described in Example 1, except that the reaction was stopped at a pH of about 6.5 rather than a pH of about 7.5. The supported catalyst activity was similar to that for the supported catalyst of Example 1, except the mechanical strength decreased.

Example 5

A supported catalyst was prepared as described in Example 1, except that smarium rather than lanthanum was used.

Example 6

A supported catalyst was prepared as described in Example 1, except that the alumina support was replaced with titania and lanthanum was increased to 10%.

Although preferred embodiments of the invention have been described herein in detail, it will be understood by those skilled in the art that variations may be made thereto without departing from the spirit of the invention.

We claim:

1. A process for making a supported catalyst comprising:
dispersing a catalytic active component within pores of a catalyst support, wherein the catalyst support optionally contains a promoter therein; and
converting the catalytic active component to an active metal complex intermediate at a pH of about 7 to about 8, the active metal complex intermediate coating surfaces of the catalyst support.

2. The process of claim 1, wherein the catalyst support is treated with an acid material.

3. A process for making a supported catalyst comprising:
combining a catalytic active component, a catalyst support optionally containing a promoter therein, and an acid material to form a slurry;
adjusting the slurry to a pH of about 7 to about 8; and
recovering the supported catalyst from the slurry.

4. The process of claim 3, further comprising calcining the supported catalyst.

5. The process of claim 4, wherein the supported catalyst is calcined at a temperature of from about 800° C. to about 970° C.

6. The process of claim 4, wherein the supported catalyst is calcined at about 960° C.

7. The process of claim 4, wherein the supported catalyst is calcined in the presence of an oxidizing gas.

8. The process of claim 3, wherein the pH of the slurry is adjusted by adding a basic material to the slurry.

9. The process of claim 8, wherein the pH of the slurry is adjusted by adding a basic material to the slurry and heating the slurry.

10. The process of claim 8, wherein the basic material is selected from the group consisting of ammonium hydroxides, metal hydroxides, and ethylene glycol.

11. The process of claim 3, wherein the catalytic active component is a transition metal salt and/or transition metal oxide.

12. The process of claim 11, wherein the transition metal salt is selected from the group consisting of transition metal nitrates, transition metal carbonates, transition metal oxalates, and transition metal formates.

13. The process of claim 11, wherein the transition metal of the transition metal salt is selected from the group consisting of nickel, cobalt, copper, chromium, iron, manganese, platinum, palladium, rhodium and ruthenium.

14. The process of claim 13, wherein the transition metal is nickel.

15. The process of claim 13, wherein the catalyst support is alumina.

16. The process of claim 15, wherein the rare-earth metal is selected from the group consisting of scandium, yttrium, lanthanide metals and mixtures thereof.

17. The process of claim 16, wherein the rare-earth metal is lanthanum.

18. The process of claim 3, wherein the catalyst support has an apparent porosity in the range of about 15% to about 80%.

19. The process of claim 3, wherein the catalyst support has a mean pore diameter in the range of about 0.05 microns to about 20 microns.

20. The process of claim 3, wherein the catalyst support is a ceramic.

21. The process of claim 3, wherein the catalyst support is selected from the group consisting of alumina silica, magnesia, titania, zirconia, beryllia, thoria, zeolites, and calcium aluminates.

22. The process of claim 3, wherein the promoter is a rare-earth metal, rare-earth metal oxide, rare-earth hydroxide, and/or rare-earth metal salt.

23. The process of claim 22, wherein the rare-earth metal salt is selected from the group consisting of rare-earth nitrates, rare-earth carbonates, rare-earth oxalates, and mixtures thereof.

24. The process of claim 22, wherein the rare-earth metal oxide is lanthanum oxide.

25. The process of claim 3, wherein the acid material is nitric acid.

26. The process of claim 3, wherein the pH is about 7.5.

27. The process of claim 3, wherein the catalytic active component is from about 20% to about 80% by weight and the catalyst support optionally containing promoter is from about 20% to about 80% by weight based on the total weight of the catalytic active component and the catalyst support optionally containing promoter.

28. The process of claim 27, wherein the catalyst support contains from about 1% by weight to about 20% by weight of the promoter.

29. The process of claim 3, further comprising reducing the supported catalyst.

30. The process of claim 29, wherein the supported catalyst is reduced using hydrogen.

31. A supported catalyst formed by the process of claim 3.

32. The supported catalyst of claim 31 for a steam reforming reaction.

33. The supported catalyst of claim 31 for an autothermal reforming reaction, wherein the promoter is present.

34. The supported catalyst of claim 31 for both a steam reforming reaction and an autothermal reforming reaction, wherein the promoter is present.

* * * * *

UNITED STATES PATENT AND TRADEMARK OFFICE
CERTIFICATE OF CORRECTION

PATENT NO. : 7,592,290 B2  Page 1 of 1
APPLICATION NO. : 10/599718
DATED : September 22, 2009
INVENTOR(S) : Hussain et al.

It is certified that error appears in the above-identified patent and that said Letters Patent is hereby corrected as shown below:

TITLE PAGE, ITEM (54) and col. 1, line 4
Title: delete "STREAM" and insert --STEAM--

Signed and Sealed this

Eighth Day of December, 2009

David J. Kappos
*Director of the United States Patent and Trademark Office*